US012682041B2

(12) United States Patent
Chen et al.

(10) Patent No.: US 12,682,041 B2
(45) Date of Patent: Jul. 14, 2026

(54) METHOD, DEVICE AND COMPUTER PROGRAM PRODUCT FOR GENERATING NEURAL NETWORK MODEL

(71) Applicant: Dell Products L.P., Round Rock, TX (US)

(72) Inventors: Tianxiang Chen, Shanghai (CN); Jinpeng Liu, Shanghai (CN); Anzhou Hou, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 769 days.

(21) Appl. No.: 18/108,931

(22) Filed: Feb. 13, 2023

(65) Prior Publication Data

US 2024/0202316 A1 Jun. 20, 2024

(30) Foreign Application Priority Data

Dec. 15, 2022 (CN) .......................... 202211615324.7

(51) Int. Cl.
*G06F 21/53* (2013.01)
*G06N 3/02* (2006.01)

(52) U.S. Cl.
CPC .............. *G06F 21/53* (2013.01); *G06N 3/02* (2013.01); *G06F 2221/2105* (2013.01)

(58) Field of Classification Search
CPC .... G06N 3/02; G06F 21/53; G06F 2221/2105
See application file for complete search history.

(56) References Cited

U.S. PATENT DOCUMENTS 10,860,925 B2 * 12/2020 Tucker .................. G06F 9/5038
12,489,621 B2 * 12/2025 Zwanzger ............ H04L 9/0825
(Continued)

FOREIGN PATENT DOCUMENTS

CN           114556344 A  *  5/2022  ........... H04L 9/3234
WO     WO-2021143466 A1 *  7/2021  ............. G06N 3/045

OTHER PUBLICATIONS

Adrien Ghosn, James R. Larus, and Edouard Bugnion. 2019. Secured routines: language-based construction of trusted execution environments. In Proceedings of the 2019 USENIX Conference on Usenix Annual Technical Conference (USENIX ATC '19). USENIX Association, USA, 571-585. (Year: 2019).*
(Continued)

*Primary Examiner* — Kamran Afshar
*Assistant Examiner* — Gwynevere A Deterding
(74) *Attorney, Agent, or Firm* — Ryan, Mason & Lewis, LLP

(57) ABSTRACT

Illustrative embodiments relate to a method, a device, and a computer program product for generating a neural network model. The method includes dividing the neural network model into multiple parts, wherein the multiple parts include a first part for processing an input to the neural network model and a second part for receiving an output from the first part. The method further includes converting, based on syntax for a trusted execution environment, a first part of code in source code of the neural network model and corresponding to the first part. The method further includes compiling the converted first part of code and a second part of code in the source code and corresponding to the second part; and arranging the compiled first part of code and the compiled second part of code respectively in the trusted execution environment and an untrusted execution environment for generating the neural network model.

20 Claims, 4 Drawing Sheets

(56) References Cited

U.S. PATENT DOCUMENTS

| | | | | |
|---|---|---|---|---|
| 2006/0161970 A1* | 7/2006 | Hopen | .................... | H04L 63/10 |
| | | | | 726/4 |
| 2020/0082270 A1* | 3/2020 | Gu | ........................ | G06F 21/606 |
| 2021/0119765 A1* | 4/2021 | Jankly | .................. | H04L 9/0891 |
| 2021/0158131 A1* | 5/2021 | Jain | ....................... | G06N 3/063 |
| 2022/0147442 A1* | 5/2022 | Sid Lakhdar | ......... | G06F 8/4441 |
| 2022/0343165 A1* | 10/2022 | Hu | ........................ | G06F 9/4806 |
| 2022/0405383 A1 | 12/2022 | Liu et al. | | |
| 2024/0062102 A1* | 2/2024 | Lal | .......................... | H04L 9/008 |
| 2024/0073732 A1* | 2/2024 | Jung | .................... | H04L 5/0057 |

OTHER PUBLICATIONS

Recommendation ITU-T X.1770: Technical guidelines for secure multi-party computation. Oct. 2021. International Telecommunication Union. (Year: 2021).*

D. Stutz, "Implementing Tensorflow Operations in C++—Including Gradients," https://davidstutz.de/implementing-tensorflow-operations-in-c-including-gradients/, Feb. 4, 2017, 14 pages.

Github, Inc. "Create an op," https://github.com/tensorflow/docs/blob/master/site/en/guide/create_op.md, Jul. 16, 2020, 30 pages.

Microsoft, "Microsoft SEAL," https://www.microsoft.com/en-us/research/project/microsoft-seal/, 2021, 4 pages.

FATE, "An Industrial Grade Federated Learning Framework," https://fate.fedai.org/, 2021, 5 pages.

Github, Inc. "Deep Learning with Intel SGX," https://github.com/landoxy/intel-sgx-deep-learning, Jan. 21, 2019, 4 pages.

Intel Corporation, "Intel® SGX SDK Developer Reference for Windows," Mar. 10, 2020, 461 pages.

Wikipedia, "Software Guard Extensions," https://en.wikipedia.org/w/index.php?title=Software_Guard_Extensions&oldid=1028673056, Jun. 15, 2021, 5 pages.

Wikipedia, "Trusted Execution Environment," https://en.wikipedia.org/w/index.php?title=Trusted_execution_environment&oldid=1027841774, Jun. 10, 2021, 7 pages.

Wikipedia, "Trusted Computing Base," https://en.wikipedia.org/wiki/Trusted_computing_base, Jan. 13, 2021, 4 pages.

Github, "Open Enclave SDK," https://openenclave.io/sdk/, Accessed Apr. 21, 2022, 3 pages.

Github, "Asylo," https://github.com/google/asylo, Accessed Apr. 21, 2022, 8 pages.

Wikipedia, "Call Stack," https://en.wikipedia.org/wiki/Call_stack, Mar. 22, 2022, 8 pages.

Wikipedia, "Homomorphic Encryption," https://en.wikipedia.org/wiki/Homomorphic_encryption, May 2, 2022, 12 pages.

U.S. Appl. No. 17/459,705 filed in the name of Jinpeng Liu et al. on Aug. 27, 2021, and entitled "Function-Based Service Framework with Trusted Execution Platform."

U.S. Appl. No. 17/829,485 filed in the name of Jinpeng Liu et al. on Jun. 1, 2022, and entitled "Multi-Party Computation Framework Based on Trusted Execution Environment."

* cited by examiner

400

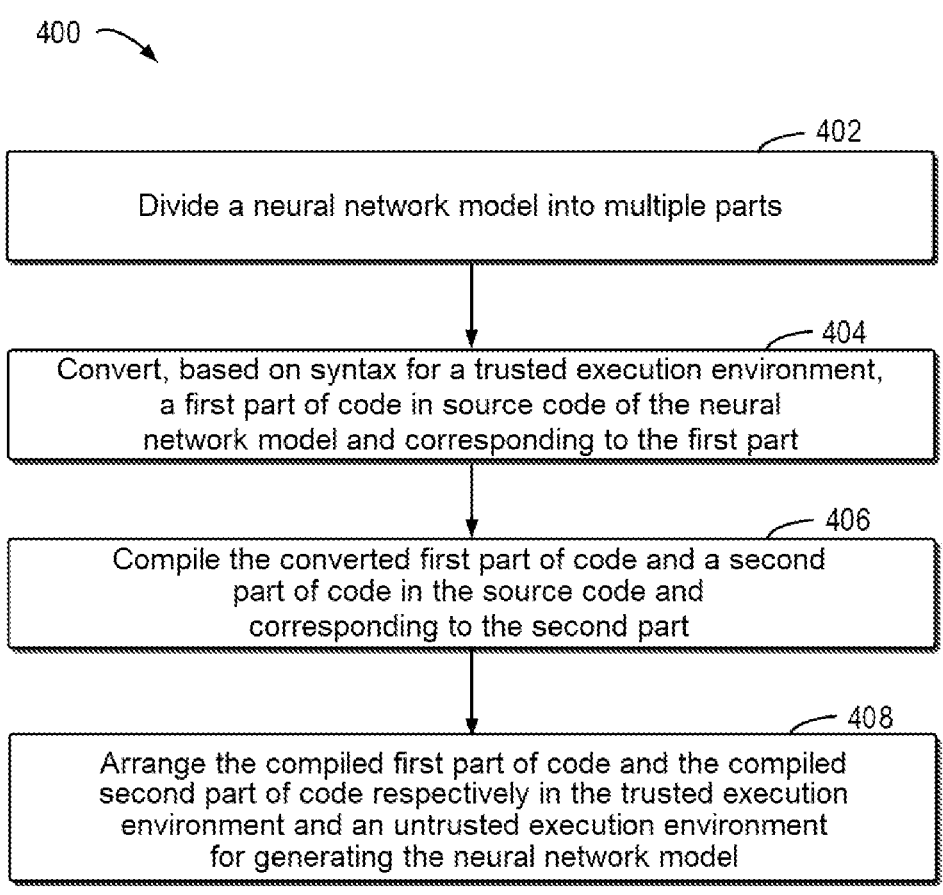

402

Divide a neural network model into multiple parts

404

Convert, based on syntax for a trusted execution environment, a first part of code in source code of the neural network model and corresponding to the first part

406

Compile the converted first part of code and a second part of code in the source code and corresponding to the second part

408

Arrange the compiled first part of code and the compiled second part of code respectively in the trusted execution environment and an untrusted execution environment for generating the neural network model

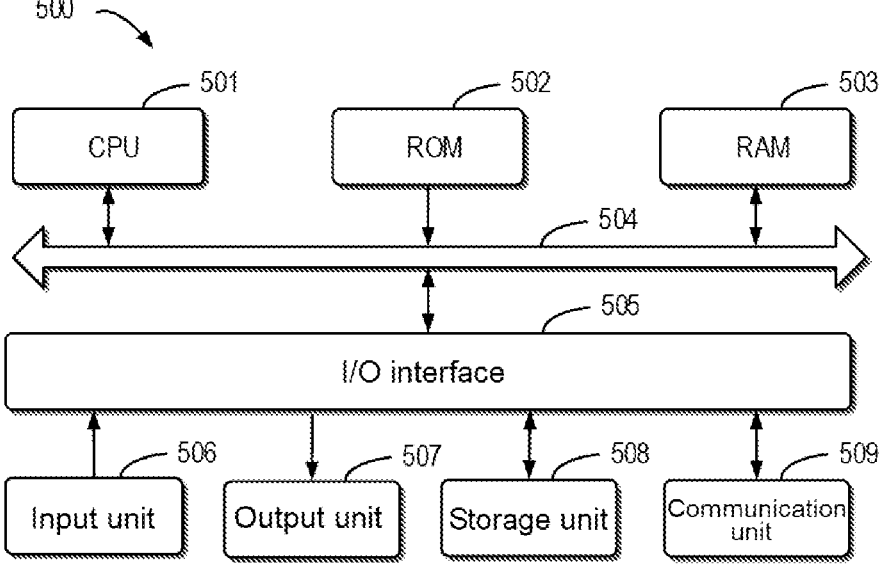

501

CPU

502

ROM

503

RAM

504

505

I/O interface

506

Input unit

507

Output unit

508

Storage unit

509

Communication unit

FIG. 5

METHOD, DEVICE AND COMPUTER PROGRAM PRODUCT FOR GENERATING NEURAL NETWORK MODEL

RELATED APPLICATION

The present application claims priority to Chinese Patent Application No. 202211615324.7, filed Dec. 15, 2022, and entitled "Method, Device, and Computer Program Product for Generating Neural Network Model," which is incorporated by reference herein in its entirety.

FIELD

Embodiments of the present disclosure generally relate to the field of machine models, and specifically relate to a method, a device, and a computer program product for generating a neural network model.

BACKGROUND

With the ongoing development of computer hardware and software technologies, it is increasingly common for a neural network model to be arranged in a computer for various data processing tasks. Along with the development of artificial intelligence technologies, the development of neural network models has recently entered a phase of rapid development. More and more neural network models are used for processing collected data in a wide range of contexts of daily life.

During data processing associated with neural networks, the problem of data security has also become an important issue. When training a neural network model, a user of the training model usually does not have the data for training the neural network model. In addition, users who provide training data do not want to provide input data to model trainers when training the neural network model. Therefore, ensuring the security of training data becomes a problem to be solved when training a neural network model.

SUMMARY

Embodiments of the present disclosure provide a method, a device, and a computer program product for generating a neural network model.

According to a first aspect of the present disclosure, a method for generating a neural network model is provided. The method includes dividing the neural network model into multiple parts, wherein the multiple parts include a first part for processing an input to the neural network model and a second part for receiving an output from the first part. The method further includes converting, based on syntax for a trusted execution environment, a first part of code in source code of the neural network model and corresponding to the first part. The method further includes compiling the converted first part of code and a second part of code in the source code and corresponding to the second part. The method further includes arranging the compiled first part of code and the compiled second part of code respectively in the trusted execution environment and an untrusted execution environment for generating the neural network model.

According to a second aspect of the present disclosure, an electronic device is provided. The electronic device includes at least one processor; and a memory coupled to the at least one processor and having instructions stored thereon, where the instructions, when executed by the at least one processor, cause the device to execute actions including: dividing a neural network model into multiple parts, wherein the multiple parts comprise a first part for processing an input to the neural network model and a second part for receiving an output from the first part; converting, based on syntax for a trusted execution environment, a first part of code in source code of the neural network model and corresponding to the first part; compiling the converted first part of code and a second part of code in the source code and corresponding to the second part; and arranging the compiled first part of code and the compiled second part of code respectively in the trusted execution environment and an untrusted execution environment for generating the neural network model.

According to a third aspect of the present disclosure, a computer program product is provided. The computer program product is tangibly stored on a non-transitory computer-readable medium and comprises machine-executable instructions, where the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

FIG. 4 is a flow chart of a method for generating a neural network model according to an embodiment of the present disclosure; and FIG. 5 is a schematic block diagram of an example device applicable to implement embodiments of the present disclosure.

In the accompanying drawings, identical or corresponding numerals represent identical or corresponding parts.

DETAILED DESCRIPTION

Figure 1:
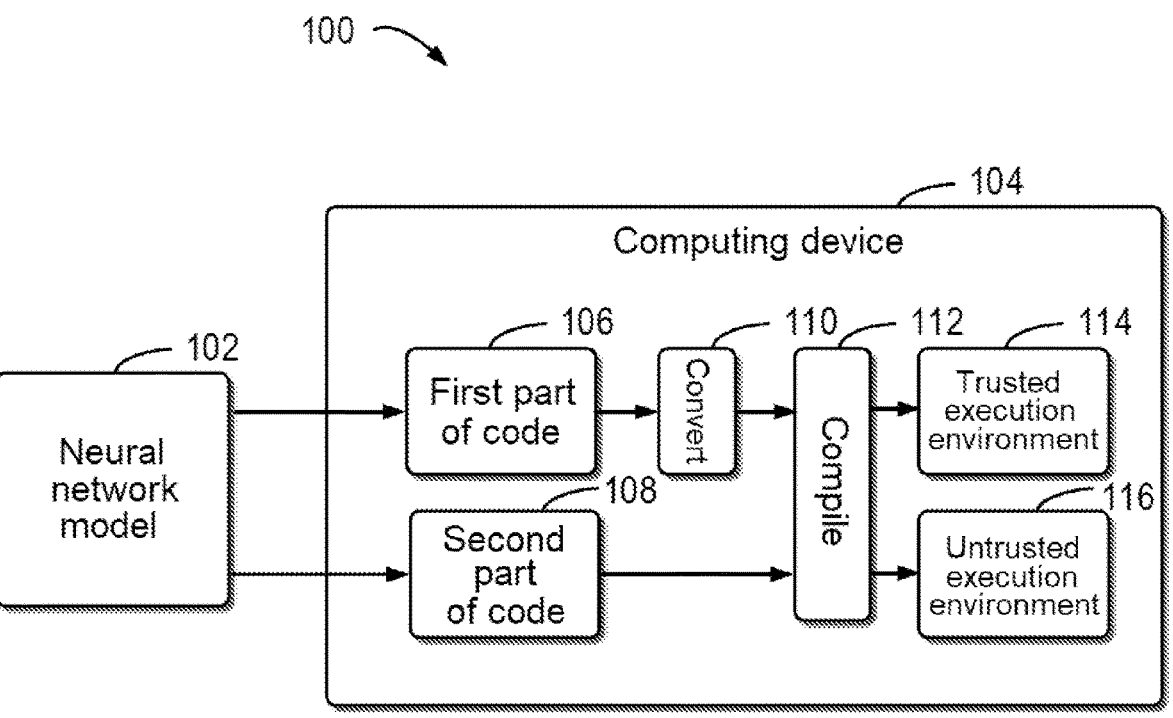
FIG. 1 is a schematic diagram of an example environment in which a device and/or a method according to embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As stated above, when training a neural network model, there is a security problem that data used for training the neural network model is acquired by an owner of the training model or others who are not data source owners. To ensure that the data for training the neural network model is not acquired by other users, some conventional schemes improve the training of the above neural network model. In a conventional scheme, a trusted execution environment (TEE) is used to ensure security of the training data of the neural network model. Because an application can use the TEE to populate protected user code and data, a trusted hardware platform, once activated, will protect the code and data of an enclave from external access and modification. At present, there are three implementations of TEE: SGX, SEV, and Trustzone. In the conventional scheme, in order to protect the security of training data, the neural network model is arranged in trusted execution environments of different security levels. At this time, technical personnel who write the neural network model need to write program codes according to different environments respectively.

However, services provided by the TEE are not easy for ordinary users to utilize because of the difficulty of learning TEE techniques. Compared with machine learning algorithm design and other fields, these schemes have few available resources when encountering problems/errors. For target users of the scheme, such as machine learning engineers, most of them are familiar with top-level deep learning frameworks and are good at algorithms and mathematics. For low-level computer systems and hardware knowledge related to TEE implementation, they may need to spend a lot of time on learning and manually defining and writing logic for these operators. This brings a lot of extra work and difficulties to users. Therefore, it is relatively difficult to arrange the neural network model in the TEE environment.

To at least solve the above and other potential problems, embodiments of the present disclosure provide a method for training a neural network model. A computing device first divides the neural network model into two parts, then performs syntax conversion on a first part of code of the neural network model for processing input data, and then compiles the converted first part of code and a second part of code of the neural network model by means of a trusted execution environment. Subsequently, the compiled first part is arranged in the trusted execution environment, and the compiled second part is arranged in an untrusted execution environment for training the neural network model. To ensure the data security, a multi-party computation frame is also introduced in the trusted execution environment so as to use the multi-party computation frame for further protecting the security of training data. By means of the method, data of a data owner can be effectively protected from being acquired by a model owner and other users, which improves the data security and speeds up arrangement and training of a model.

Illustrative embodiments of the present disclosure will be further described in detail below with reference to the accompanying drawings, where FIG. 1 shows an example environment in which a device and/or a method according to embodiments of the present disclosure can be implemented.

As shown in FIG. 1, example environment 100 includes computing device 104, and computing device 104 may divide code of neural network model 102 into two parts and deploy them respectively in trusted execution environment 114 and untrusted execution environment 116.

Example computing device 104 includes, but is not limited to, a personal computer, a server computer, a handheld or laptop device, a mobile device, a multiprocessor system, a consumer electronic product, a minicomputer, a mainframe computer, a distributed computing environment including any of the above systems or devices, and the like.

Computing device 104 analyzes neural network model 102 and then divides source code thereof into first part of code 106 and second part of code 108. First part of code 106 is used to process input data for training the neural network model. The first part of code 106 corresponds to operators in the front of the neural network model, and each operator may correspond to a layer of the neural network model such as an input layer, a convolution layer, or a pooling layer. To ensure that an input for training the neural network model cannot be acquired from an output generated by the first part of code 106, the first part of code 106 usually corresponds to two operators or first two layers of the neural network model. At this time, parameters of the second layer in the first two layers are unknown to users. In some embodiment, initial parameters of the second layer when performing initial training are generated randomly. The above examples are only used for describing the present disclosure, and are not intended to specifically define the present disclosure.

Then, computing device 104 performs a conversion operation on the first part of code 106 at block 110. Since first part of code 106 is to be placed in trusted execution environment 114, the syntax available in trusted execution environment 114, for example, is used to convert the first part of code 106, so that the converted first part of code 106 can be used in trusted execution environment 114. Converted first part of code 106 and second part of code 108 are compiled 112 by a compiler for the trusted execution environment, so that the first part of code 106 deployed to the trusted execution environment can communicate with second part of code 108 deployed to the untrusted execution environment. Then, the neural network model is trained by means of data provided by a data owner.

Alternatively or additionally, a multi-party computation frame can also be introduced in trusted execution environment 114. Execution of the first part of code 106 in trusted execution environment 114 is further protected by means of the introduced multi-party computation frame. The multi-party computation frame can be verified by a data owner of the neural network model and an owner of the neural network model so as to determine whether the trusted execution environment is trusted. After passing the verification, the data owner may provide data for the first part of code 106 based on the multi-party computation frame. For example, the data owner inputs encrypted data to the multi-party computation frame, and the data is decrypted by the multi-party computation frame and then executed by the first part of code 106. Then, a processing result of the first part of code 106 is transmitted to second part of code 108 of the neural network model via an interface between the trusted execution environment and the untrusted execution environment for continued processing until the training is completed. Then, parameters related to the first part of code 106 of the neural network model trained in the trusted execution environment can be provided to the model owner via the multi-party computation frame. For example, the parameters can be output via an output address of a computation result indicated in configuration information of the multi-party computation frame.

By means of the method, data of the data owner can be effectively protected from being acquired by the model owner and other users, thereby improving data security, speeding up arrangement of the neural network model, and improving user experience.

An example environment in which a device and/or a method of embodiments of the present disclosure can be implemented is described above with reference to FIG. 1. A schematic diagram of a structure of neural network model 200 according to an embodiment of the present disclosure is described below with reference to FIG. 2.

Figure 2:
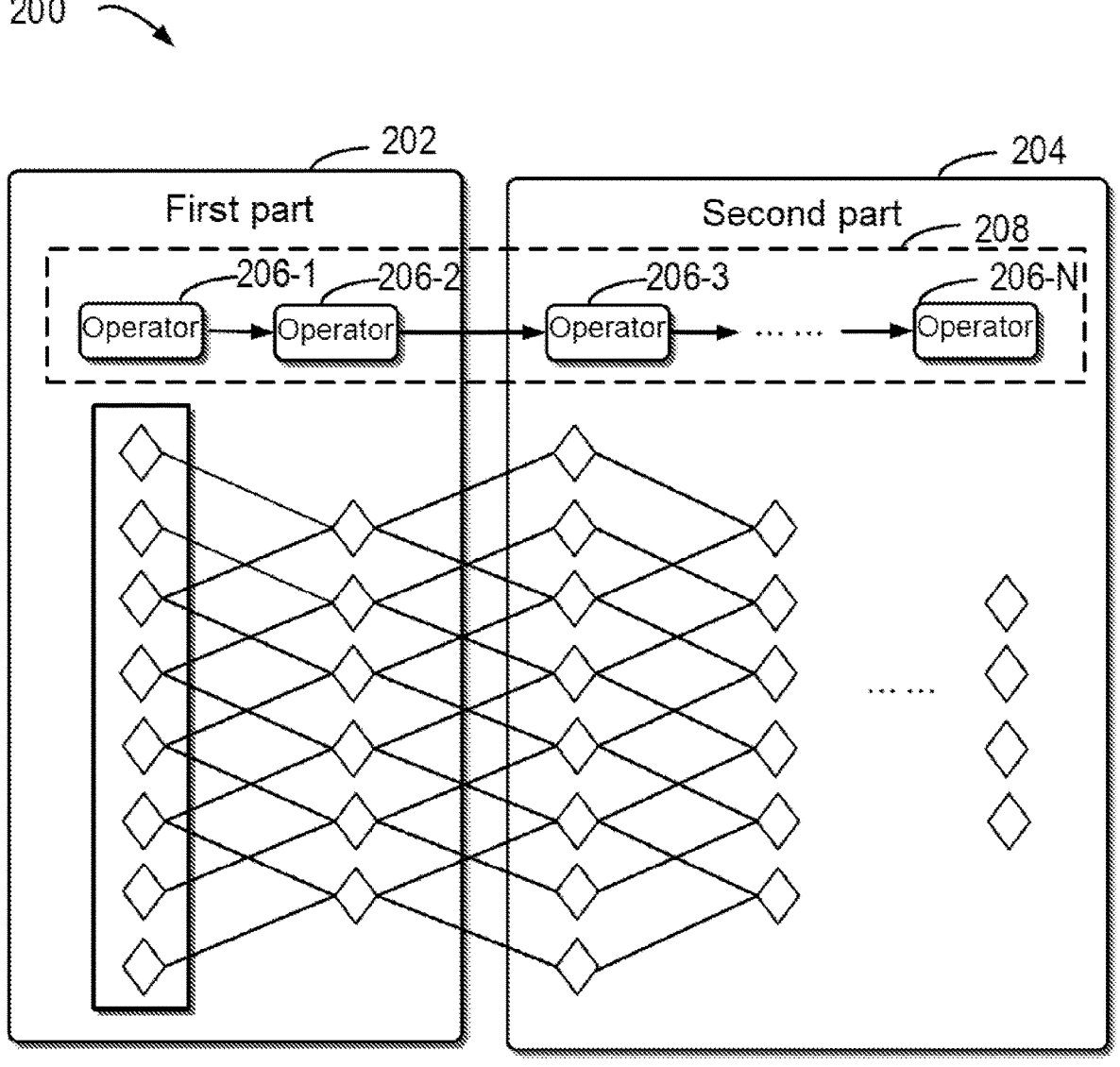
FIG. 2 is a schematic diagram of a structure of a neural network model according to an embodiment of the present disclosure.

As shown in FIG. 2, neural network model 200 includes a network structure formed by multiple layers. Computational graph 208 of the neural network model can be obtained by analyzing the network structure. Computational graph 208 includes operators 206-1, 206-2, 206-3, . . . , and 206-N that are corresponding to the layers, where N is a positive integer. For convenience of description, they can also be referred to as operator 206. In an example, operators of the neural network model are obtained from a neural network structure of the neural network model by means of, for example, Open Neural Network Exchange (ONNX). To protect data security, operators of the neural network model are grouped so as to divide the neural network model into two parts, i.e., 202 and 204. First part 202 includes operator 206-1 and operator 206-2, and the second part includes remaining operators 206. The above examples are only used for describing the present disclosure, and are not intended to specifically define the present disclosure. Those skilled in the art can determine the number of operators included in each part according to the particular security needs of a given implementation.

FIG. 2 above describes a schematic diagram of a structure of neural network model 200 according to an embodiment of the present disclosure. A schematic diagram of example 300 of applying a multi-party computation frame is further described below with reference to FIG. 3.

Figure 3:
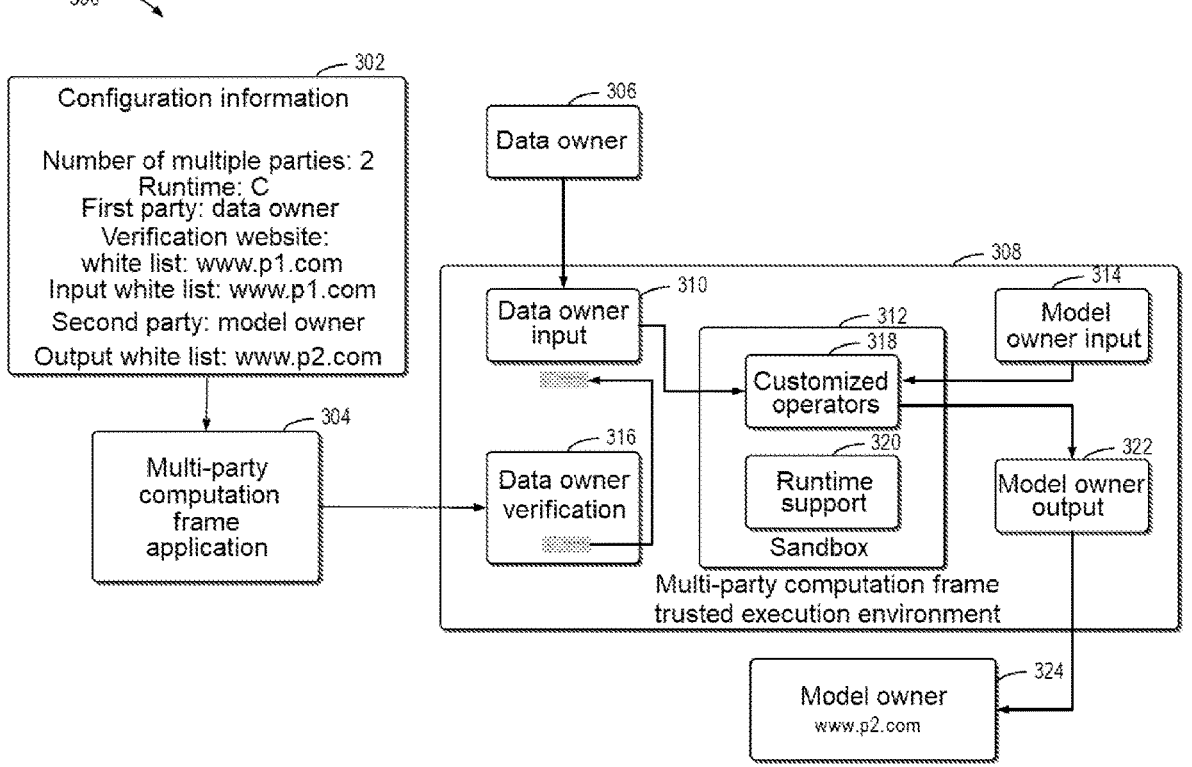
FIG. 3 is a schematic diagram of an example for applying a multi-party computation frame according to an embodiment of the present disclosure.

As shown in FIG. 3, example 300 includes multi-party computation frame trusted execution environment 308, and multi-party computation frame application 304 can be applied to multi-party computation frame trusted execution environment 308. Multi-party computation frame application 304 includes configuration information 302 for the application. For the neural network model used for training, configuration information 302 may include the number of the multiple parties involved in the neural network model, where the number of the multiple parties in FIG. 3 is 2; a runtime environment, for example, a C language runtime environment; a first party and a second party of the multiple parties, for example, data owner 306 and model owner 324; and also includes addresses of verification websites of different parties, so as to verify multi-party computation frame trusted execution environment 308. In an example, the data owner verifies 316 hardware of multi-party computation frame trusted execution environment 308 through, for example, a hash value of a hardware identifier. In another example, the data owner verifies 316 software of multi-party computation frame trusted execution environment 308 through, for example, a hash value of the software. In still another example, the data owner verifies 316 software and hardware of multi-party computation frame trusted execution environment 308. The above examples are only used for describing the present disclosure, and are not intended to specifically define the present disclosure.

In a multi-party application frame, after data owner 306 verifies multi-party computation frame trusted execution environment 308, data owner 306 may input encrypted input data to sandbox 312 as data owner input 310. For example, sandbox 312 runs customized operators 318 such as the first part of code of the neural network model. Customized operators 318 may receive model owner input 314, for example, model code or some model parameters. Sandbox 312 also includes runtime support 320, for example, underlying functions corresponding to the C language runtime environment, to support the operation of customized operators 318. During a training process, results output by customized operators 318 can be input to the second part of code running in the untrusted execution environment for training. After the training is completed, parameters of the trained model can be output by model owner output 322 so as to be sent to model owner 324. For example, the results are output according to configuration information 302.

A schematic diagram of example 300 of applying a multi-party computation frame is described above with reference to FIG. 3. An example flow chart of a method for generating a neural network model according to an embodiment of the present disclosure is described below with reference to FIG. 4. The method 400 in FIG. 4 can be executed on computing device 104 in FIG. 1 or any appropriate computing device.

As shown in FIG. 4, at block 402, a neural network model is divided into multiple parts, where the multiple parts include a first part for processing an input to the neural network model and a second part for receiving an output from the first part. For example, computing device 104 in FIG. 1 divides neural network model 102 into the first part and the second part. Each of the parts has a corresponding part of code, for example, first part of code 106 and second part of code 108.

In some embodiments, during a process of dividing the neural network model into multiple parts by computing device 104, computing device 104 first determines a computational graph of the neural network model, and the computational graph includes multiple operators. For example, a frame of the neural network model is input to, for example, an Open Neural Network Exchange (ONNX) tool, to determine an operator graph of the neural network model and corresponding operators. The above examples are only used for describing the present disclosure, and are not intended to specifically define the present disclosure. Those skilled in the art can use other appropriate tools to determine operators.

In some embodiments, to ensure data security of the data owner, the neural network model is divided into two parts. Then, operators for processing data input in the first part are placed in a trusted execution environment, and the second part is placed in an untrusted execution environment so as to reduce the complexity of computation of the neural network model. During the process, the computing device divides multiple operators into two sets of operators, and determines the first part and the second part that correspond to the sets of operators based on the two sets of operators. In this way, the structure of the neural network model can be split quickly, and the decomposition speed of the model can be improved.

In some embodiments, computing device 104 acquires, from source code corresponding to the neural network model, a first part of code corresponding to the first set of operators in the two sets of operators. Further, the second part of code can be obtained from the source code by means of the second set of operators. In this way, different parts of the source code can be quickly determined.

At block 404, based on syntax for the trusted execution environment, the first part of code in the source code of the neural network model and corresponding to the first part is converted. For example, computing device 104 in FIG. 1 performs syntax conversion for the trusted execution environment on first part of code 106. In an example, the computing device converts the first part of code according to a hard coding rule. Terms such as "hard coding" or "hard code" usually mean that, in a software implementation, relevant parameters of output or input (such as path, output form or format) are directly written in the source code in the form of constants, rather than responding appropriately to the settings, resources, data, or formats specified by the outside world during the execution.

At block 406, the converted first part of code and a second part of code in the source code and corresponding to the second part are compiled. For example, when used for compiling of the trusted execution environment in computing device 104, converted first part of code 106 and the second part of code 108 can be compiled. During this process, an interface that can achieve communication of the two parts of code between the trusted execution environment and the untrusted execution environment can be added in the first part of code and the second part of code. For example, a Software Guard Extensions (SGX) compiler is used to compile the first part of code and the second part of code. During the compiling process, enclave calls (ECALLs) and outside calls (OCALLs) are added to communicate between the first part of code of the trusted execution environment and the second part of code of the untrusted execution environment. In this way, data security is ensured.

At block 408, the compiled first part of code and the compiled second part of code are respectively arranged in the trusted execution environment and the untrusted execution environment for generating the neural network model. Computing device 104 respectively deploys the compiled code in two execution environments of different levels such as the trusted execution environment and the untrusted execution environment.

After deploying the code, a runtime environment is set in the trusted execution environment to support the operation of the first part of code in the trusted execution environment. In an example, the computing device arranges a runtime environment in the trusted execution environment according to the programming language of the neural network model. For example, the programming language is C. Then, the underlying support program corresponding to the C language is loaded to implement the runtime environment.

Alternatively or additionally, a multi-party computation frame can also be applied in the trusted computing environment. For the multi-party computation frame, configuration information is collected from all parties to generate the configuration information or configuration file for the multi-party computation frame. In an example, the configuration information includes multiple parties participating in the computation of the neural network model. In another example, the configuration information includes a runtime environment of the neural network model. In still another example, the configuration information includes an input address where the multi-party computation frame acquires an input from one of the multiple parties. In a further example, the configuration information includes an output address where the multi-party computation frame returns a computation result to one of the multiple parties. The above examples are only used for describing the present disclosure, and are not intended to specifically define the present disclosure. Those skilled in the art can set the content of the configuration information according to the particular needs of a given implementation.

In some embodiments, after applying the multi-party computation frame, the trusted execution environment also passes verification by each of the multiple parties. If the trusted execution environment passes verification by each of the multiple parties, a secure communication channel is established between each of the multiple parties and the trusted execution environment, for example, a communication channel for a Transport Layer Security (TLS) protocol and a Secure Sockets Layer (SSL) protocol. If the verification is not passed, it indicates that the trusted execution environment of the multi-party computation frame application is not trusted.

In some embodiments, after deploying the first part and second part of the code of the neural network model, computing device 104 acquires encrypted data from the input address. For example, input encrypted data is received from the first party according to the configuration information. Then, the encrypted data is decrypted. Subsequently, the decrypted data input is calculated by means of the first part of the neural network model to obtain an intermediate result. Then, the intermediate result is transmitted to the second part for training the neural network model, for example, by means of OCALLs or an OCALL interface.

After completing the training, computing device 104 returns model parameters for the first part to the output address as a computation result by means of an output address specified by the configuration information.

By means of the method, data of the data owner can be effectively protected from being acquired by the model owner and other users, thereby improving data security, speeding up arrangement of the neural network model, and improving user experience.

FIG. 5 is a schematic block diagram of example device 500 that can be used to implement embodiments of the present disclosure. Computing device 104 in FIG. 1 may be implemented by device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 into random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Various processes and processing described above, for example, method 400, may be performed by CPU 501. For example, in some embodiments, method 400 may be implemented as a computer software program which is tangibly included in a machine-readable medium such as storage unit 508. In some embodiments, part of or all the computer program may be loaded and/or installed to device 500 via ROM 502 and/or communication unit 509. When the computer program is loaded into RAM 503 and executed by CPU 501, one or more actions of method 400 described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:
deploying a processor-based trusted execution environment in a multi-party computation system;
verifying, in the trusted execution environment of the multi-party computation system, a first entity that provides training data to be used in training a neural network model and a second entity that provides the neural network model to be trained;
dividing, in the multi-party computation system, the neural network model into multiple parts based on a computational graph of the neural network model, wherein the multiple parts comprise a first part for processing an input to the neural network model, the input comprising at least a portion of the training data provided by the first entity, and a second part for receiving an output from the first part, wherein at least portions of respective ones of the first and second parts collectively comprise a sequence of serially-connected operators of the neural network model;
converting, in the multi-party computation system and based on syntax for the trusted execution environment, a first part of code in source code of the neural network model and corresponding to the first part of the neural network model;
compiling, in the multi-party computation system, the converted first part of code and a second part of code in the source code and corresponding to the second part of the neural network model, wherein compiling the converted first part of code and the second part of code further comprises (i) adding one or more enclave calls and (ii) adding one or more outside calls, to support communication between the trusted execution environment and an untrusted execution environment; and
executing the compiled first part of code and the compiled second part of code respectively in the trusted execution environment and the untrusted execution environment to train the neural network model utilizing the input comprising at least a portion of the training data provided by the first entity.

2. The method according to claim 1, wherein dividing the neural network model into multiple parts comprises:
determining the computational graph of the neural network model, wherein the computational graph comprises multiple operators; and
dividing the multiple operators into two sets of operators based on security of the input, wherein the two sets of operators respectively correspond to the first part and the second part.

3. The method according to claim 2, further comprising:
acquiring, from the source code, the first part of code corresponding to a first set of operators in the two sets of operators.

4. The method according to claim 1, wherein converting the first part of code comprises:
converting the first part of code based on a hard coding rule.

5. The method according to claim 1, wherein compiling the converted first part of code and the second part of code comprises:
generating, in the first part of code and the second part of code, code corresponding to an interface capable of communicating between the trusted execution environment and the untrusted execution environment.

6. The method according to claim 1, further comprising:
arranging, based on a programming language of the neural network model, a runtime environment in the trusted execution environment.

7. The method according to claim 1, further comprising:
acquiring configuration information of a multi-party computation frame for the trusted execution environment, wherein the configuration information comprises at least one of the following: multiple parties participating in computation of the neural network model; a runtime environment of the neural network model; an input address where the multi-party computation frame acquires an input from one of the multiple parties; or an output address where the multi-party computation frame returns a computation result to one of the multiple parties.

8. The method according to claim 7, further comprising:
determining whether the trusted execution environment passes verification by each of the multiple parties; and
establishing, in response to determining that the trusted execution environment passes verification by each of the multiple parties, a secure communication channel between each of the multiple parties and the trusted execution environment.

9. The method according to claim 7, further comprising:
acquiring encrypted data from the input address;
decrypting the encrypted data;
inputting the decrypted data into the first part of the neural network model to obtain an intermediate result; and
transmitting the intermediate result to the second part so as to train the neural network model.

10. The method according to claim 9, further comprising:
returning, based on the configuration information, model parameters for the first part to the output address as the computation result.

11. An electronic device, comprising:
at least one processor; and
memory coupled to the at least one processor and having instructions stored therein, wherein the instructions, when executed by the at least one processor, cause the electronic device to execute actions comprising:
deploying a processor-based trusted execution environment in a multi-party computation system;
verifying, in the trusted execution environment of the multi-party computation system, a first entity that provides training data to be used in training a neural network model and a second entity that provides the neural network model to be trained;
dividing, in the multi-party computation system, the neural network model into multiple parts based on a computational graph of the neural network model, wherein the multiple parts comprise a first part for processing an input to the neural network model, the input comprising at least a portion of the training data provided by the first entity, and a second part for receiving an output from the first part, wherein at least portions of respective ones of the first and second parts collectively comprise a sequence of serially-connected operators of the neural network model;

converting, in the multi-party computation system and based on syntax for the trusted execution environment, a first part of code in source code of the neural network model and corresponding to the first part of the neural network model;

compiling, in the multi-party computation system, the converted first part of code and a second part of code in the source code and corresponding to the second part of the neural network model, wherein compiling the converted first part of code and the second part of code further comprises (i) adding one or more enclave calls and (ii) adding one or more outside calls, to support communication between the trusted execution environment and an untrusted execution environment; and executing the compiled first part of code and the compiled second part of code respectively in the trusted execution environment and the untrusted execution environment to train the neural network model utilizing the input comprising at least a portion of the training data provided by the first entity.

12. The electronic device according to claim 11, wherein dividing the neural network model into multiple parts comprises:

determining the computational graph of the neural network model, wherein the computational graph comprises multiple operators; and dividing the multiple operators into two sets of operators based on security of the input, wherein the two sets of operators respectively correspond to the first part and the second part.

13. The electronic device according to claim 12, wherein the actions further comprise:

acquiring, from the source code, the first part of code corresponding to a first set of operators in the two sets of operators.

14. The electronic device according to claim 11, wherein converting the first part of code comprises:

converting the first part of code based on a hard coding rule.

15. The electronic device according to claim 11, wherein compiling the converted first part of code and the second part of code comprises:

generating, in the first part of code and the second part of code, code corresponding to an interface capable of communicating between the trusted execution environment and the untrusted execution environment.

16. The electronic device according to claim 11, wherein the actions further comprise:

arranging, based on a programming language of the neural network model, a runtime environment in the trusted execution environment.

17. The electronic device according to claim 11, wherein the actions further comprise:

acquiring configuration information of a multi-party computation frame for the trusted execution environment, wherein the configuration information comprises at least one of the following: multiple parties participating in computation of the neural network model; a runtime environment of the neural network model; an input address where the multi-party computation frame acquires an input from one of the multiple parties; or an output address where the multi-party computation frame returns a computation result to one of the multiple parties.

18. The electronic device according to claim 17, wherein the actions further comprise:

determining whether the trusted execution environment passes verification by each of the multiple parties; and establishing, in response to determining that the trusted execution environment passes verification by each of the multiple parties, a secure communication channel between each of the multiple parties and the trusted execution environment.

19. The electronic device according to claim 17, wherein the actions further comprise:

acquiring encrypted data from the input address;

decrypting the encrypted data;

inputting the decrypted data into the first part of the neural network model to obtain an intermediate result; and transmitting the intermediate result to the second part so as to train the neural network model.

20. A computer program product comprising a non-transitory computer-readable medium having machine-executable instructions stored therein, wherein the machine-executable instructions, when executed by a machine, cause the machine to perform actions comprising:

deploying a processor-based trusted execution environment in a multi-party computation system;

verifying, in the trusted execution environment of the multi-party computation system, a first entity that provides training data to be used in training a neural network model and a second entity that provides the neural network model to be trained;

dividing, in the multi-party computation system, the neural network model into multiple parts based on a computational graph of the neural network model, wherein the multiple parts comprise a first part for processing an input to the neural network model, the input comprising at least a portion of the training data provided by the first entity, and a second part for receiving an output from the first part, wherein at least portions of respective ones of the first and second parts collectively comprise a sequence of serially-connected operators of the neural network model;

converting, in the multi-party computation system and based on syntax for the trusted execution environment, a first part of code in source code of the neural network model and corresponding to the first part of the neural network model;

compiling, in the multi-party computation system, the converted first part of code and a second part of code in the source code and corresponding to the second part of the neural network model, wherein compiling the converted first part of code and the second part of code further comprises (i) adding one or more enclave calls and (ii) adding one or more outside calls, to support communication between the trusted execution environment and an untrusted execution environment; and executing the compiled first part of code and the compiled second part of code respectively in the trusted execution environment and the untrusted execution environment to train the neural network model utilizing the input comprising at least a portion of the training data provided by the first entity.

* * * * *